United States Patent
Dickerson et al.

(10) Patent No.: US 10,295,675 B2
(45) Date of Patent: May 21, 2019

(54) CRYPTOGRAPHICALLY-SECURE AUTONOMOUS DETECTION OF SPOOFED GNSS SIGNALS

(71) Applicant: Arbiter Systems, Incorporated, Paso Robles, CA (US)

(72) Inventors: William J. Dickerson, Cranbrook (CA); Robert T. Dickerson, Paso Robles, CA (US); Joshua R. Dickerson, Paso Robles, CA (US)

(73) Assignee: Arbiter Systems, Incorporated, Paso Robles, CA (US)

( * ) Notice: Subject to any disclaimer, the term of this patent is extended or adjusted under 35 U.S.C. 154(b) by 1336 days.

(21) Appl. No.: 14/340,459

(22) Filed: Jul. 24, 2014

(65) Prior Publication Data

US 2018/0196141 A1    Jul. 12, 2018

Related U.S. Application Data (60) Provisional application No. 61/859,126, filed on Jul. 26, 2013.

(51) Int. Cl.
*G01S 19/21* (2010.01)
*H04L 9/08* (2006.01)

(52) U.S. Cl.
CPC .......... *G01S 19/215* (2013.01); *H04L 9/0869* (2013.01); *H04L 9/0872* (2013.01)

(58) Field of Classification Search
CPC .................................................. G01S 19/215
USPC ......................................................... 342/16
See application file for complete search history.

(56) References Cited

U.S. PATENT DOCUMENTS

| | | | | |
|---|---|---|---|---|
| 5,557,284 | A * | 9/1996 | Hartman | G01S 19/215 342/352 |
| 6,933,885 | B1 * | 8/2005 | Stockmaster | G01S 19/21 342/16 |
| 7,305,021 | B2 | 12/2007 | Ledvina | |
| 7,372,400 | B2 * | 5/2008 | Cohen | G01S 19/05 342/357.29 |
| 7,450,060 | B2 | 11/2008 | Strachan | |
| 7,671,794 | B2 * | 3/2010 | Pinto | G01S 19/47 342/357.29 |
| 7,697,919 | B1 * | 4/2010 | Stratton | G01S 19/215 455/3.02 |
| RE41,382 | E | 6/2010 | Yee | |
| 7,751,779 | B2 * | 7/2010 | Ho | H04B 7/18515 342/352 |

(Continued)

FOREIGN PATENT DOCUMENTS

WO    2014047378    3/2014

*Primary Examiner* — Marcus E Windrich
(74) *Attorney, Agent, or Firm* — Fitch, Even, Tabin & Flannery LLP (57) ABSTRACT

Methods and systems for cryptographically-secure autonomous detection of spoofed GNSS signals is provided. A method is provided that includes the steps of: generating a cryptographic code, controlling a motion of at least one antenna of a Global Navigation Satellite System (GNSS) receiver system according to the cryptographic code, detecting a plurality of satellite signals during the controlled motion of the at least one antenna, and determining, based on carrier phase variations of the detected plurality of satellite signals, whether the plurality of satellite signals originated from a spoofer transmitter.

22 Claims, 4 Drawing Sheets

(56) References Cited

U.S. PATENT DOCUMENTS

| | | | |
|---|---|---|---|
| 7,952,519 B1* | 5/2011 | Nielsen | G01S 19/215 342/357.59 |
| 8,340,588 B2 | 12/2012 | Nielsen | |
| 8,712,051 B2 | 4/2014 | Psiaki | |
| 8,922,427 B2* | 12/2014 | Dehnie | G01S 19/47 342/357.3 |
| 2007/0247362 A1* | 10/2007 | Strachan | G01S 19/215 342/357.29 |
| 2011/0102259 A1* | 5/2011 | Ledvina | G01S 19/215 342/357.59 |
| 2012/0121087 A1* | 5/2012 | Psiaki | G01S 19/215 380/255 |
| 2013/0157605 A1* | 6/2013 | Dickman | H04B 1/10 455/296 |
| 2014/0152499 A1 | 6/2014 | Vosburgh | |
| 2015/0234053 A1* | 8/2015 | Psiaki | G01S 19/215 342/357.51 |
| 2016/0109576 A1* | 4/2016 | Folkers | G01S 19/09 342/357.46 |

* cited by examiner

20
CRYPTOGRAPHICALLY-SECURE AUTONOMOUS DETECTION OF SPOOFED GNSS SIGNALS

This application claims the benefit of U.S. Provisional Application No. 61/859,126, filed Jul. 26, 2013, for CRYPTOGRAPHICALLY SECURE AUTONOMOUS DETECTION OF SPOOFED GNSS SIGNALS which is incorporated in its entirety herein by reference.

BACKGROUND OF THE INVENTION

1. Field of the Invention

The present invention relates generally to Global Navigation Satellite Systems (GNSS) and more specifically to the detection of spoofed GNSS signals.

2. Discussion of the Related Art

Global Navigation Satellite Systems, or GNSS (of which the U.S. Global Positioning System is an example) employ a constellation of satellites that broadcast signals which can be received anywhere in the world. A receiver, on the ground or in a vehicle (e.g., automobile, aircraft, or marine vessel) can determine its location and the precise time by receiving signals from several different satellites and solving a set of simultaneous equations. Billions of low-cost receivers have been deployed worldwide, and the use of GNSS has become a powerful enabler of new technologies and businesses. The market for GPS user equipment alone is estimated at over $30 billion per year and the commerce enabled at least $100 billion per year.

The received GNSS signals are very low in power, due to the long distances the signals travels and the modest transmitter power, limited by satellite electronics. Therefore, it is possible for an adversary to generate a set of signals that have characteristics similar to the actual satellite signals, and, by varying the characteristics of those signals, 'spoof' the receiver, or cause it to produce a position and time solution which is plausible but incorrect.

This is in contrast to jamming, which can be either intentional or accidental. Jamming causes the receiver to lose lock to the satellite signals. This is immediately detected by the receiver, and normally generates an alarm to the client (human or machine). In other words, in the case of jamming, service is denied but the client knows it and can take remedial action. In the case of spoofing, the client is unaware and goes about his normal business, though with incorrect information. This presents a risk of loss to the client, which depending on the circumstances might include monetary loss, loss of equipment and even possibly loss of life.

SUMMARY OF THE INVENTION

Several embodiments of the invention advantageously address the needs above as well as other needs by providing a cryptographically-secure detection of spoofed GNSS signals.

In one embodiment, the invention can be characterized as a method for spoofed signal detection. The method comprises the steps of: generating a cryptographic code, controlling a motion of at least one antenna of a Global Navigation Satellite System (GNSS) receiver system according to the cryptographic code, detecting a plurality of satellite signals during the controlled motion of the at least one antenna, and determining, based on carrier phase variations of the detected plurality of satellite signals, whether the plurality of satellite signals originated from a spoofer transmitter.

In another embodiment, the invention can be characterized as a system for spoof signal detection comprising: a cryptographic code generator for generating a cryptographic code, an antenna controller for controlling a motion of at least one antenna of a Global Navigation Satellite System (GNSS) receiver system according to the cryptographic code, and a receiver unit. The receiver unit is configured to detect a plurality of satellite signals received during the controlled motion of the at least one antenna, and determine, based on carrier phase variations of the detected plurality of satellite signals, whether the plurality of satellite signals originated from a spoofer transmitter.

In a further embodiment, the invention may be characterized as a method for antenna motion control. The method includes the steps of: receiving a cryptographic code from a cryptographic code generator, translating the cryptographic code into a sequence of motions, controlling a motion of at least one antenna of a Global Navigation Satellite System (GNSS) receiver system based on the sequence of motions, and providing a plurality of satellite signals received during the controlled movement of the at least one antenna to a receiver unit.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1A:
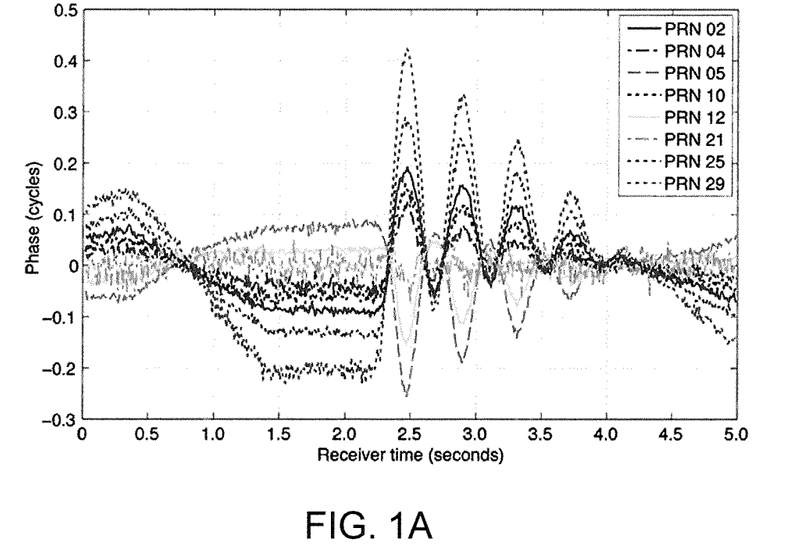
FIGS. 1A and 1B are examples of carrier phase time graphs according to the prior art.
Figure 1B:
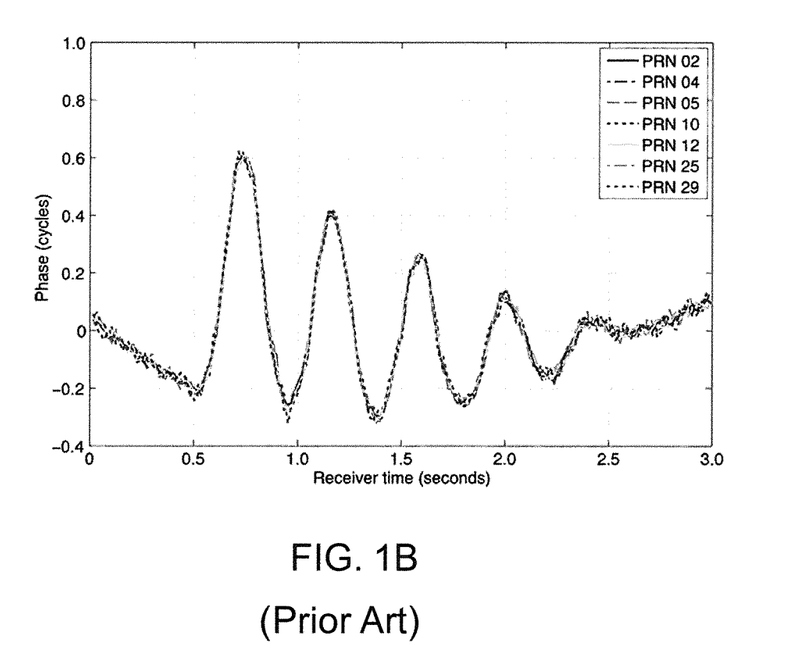

Referring first to FIGS. 1A and 1B, carrier phase time graphs of normal signals and spoofed signals are shown. WO/2014/047378 to Psiaki et al (hereinafter "Psiaki") discloses a method of detecting GNSS spoofing by means of a mechanically-oscillating receive antenna, which creates characteristic 'signatures' in the carrier phase of the GNSS signal. Psiaki is incorporated by reference herein. The 'signature' is notably different for the spoofed and normal cases, which may be discriminated with high confidence and reliability. This is shown in FIGS. 7 and 8 of Psiaki reproduced here as FIGS. 1A and 1B.

In these figures, the effect of moving the antenna in a damped-sinusoid pattern on normal (FIG. 1A) and spoofed (FIG. 1B) GNSS signals is seen. The effect on the normal signals in FIG. 1A is different for each signal, though they are correlated to a degree. This is a result of the differences in geometry between the satellites and the antenna; the incoming signals arrive from different directions and exhibit varying degrees of Doppler Effect. In FIG. 1B, all signals are affected equally by the antenna motion. This is because all signals arrive at the antenna from the same direction—the location of the spoofer. The difference is easily visible to the untrained eye, and it can also be readily detected by automated means with high reliability (i.e., high probability of correctly detecting spoofing) and security (low probability of false alarms), as Psiaki teaches in detail.

However, aside from the problem of moving the antenna mechanically, which in an actual device requires a robust and reliable actuator with a lifetime of 10-20 years, the method described in Psiaki is subject to more advanced forms of spoofing. An adversary who knows that this method is being used can devise spoofing signals to overcome Psiaki's techniques, since Psiaki is based on deterministic motions.

For example, the adversary may determine the pattern of antenna motion via remote sensing, and then compensate for it in the spoofing signal. In another example, the adversary may place the spoofer in a location to which the moving antenna is insensitive, and generating a plausible facsimile of the signals the receiver expects to see. For instance, if the antenna moves symmetrically along a short line segment as in Psiaki, any point at a distance much greater than the magnitude of the antenna motion and on a perpendicular plane bisecting that line segment would be a point of insensitivity. All points on that line segment are, for all practical purposes, equidistant to said point on the plane. For a spoofer located on said plane, far enough from the antenna, the motion of the antenna would not affect the spoofed signal detectably, leaving the spoofer to interject his own plausible but incorrect signal. Simple one-dimensional vertical motion provides the greatest vulnerability for a potential adversary: the plane of insensitivity extends to the horizon in all directions. Additionally, so long as the motion of the antenna (physical or synthetic) is regular, such as a sinusoidal oscillation, averaging over a period of time can improve signal-to-noise ratio and allow determination of the parameters of oscillation. Knowing these parameters, an adversary can defeat Psiaki's anti-spoofing method and avoid detection.

Figure 2:
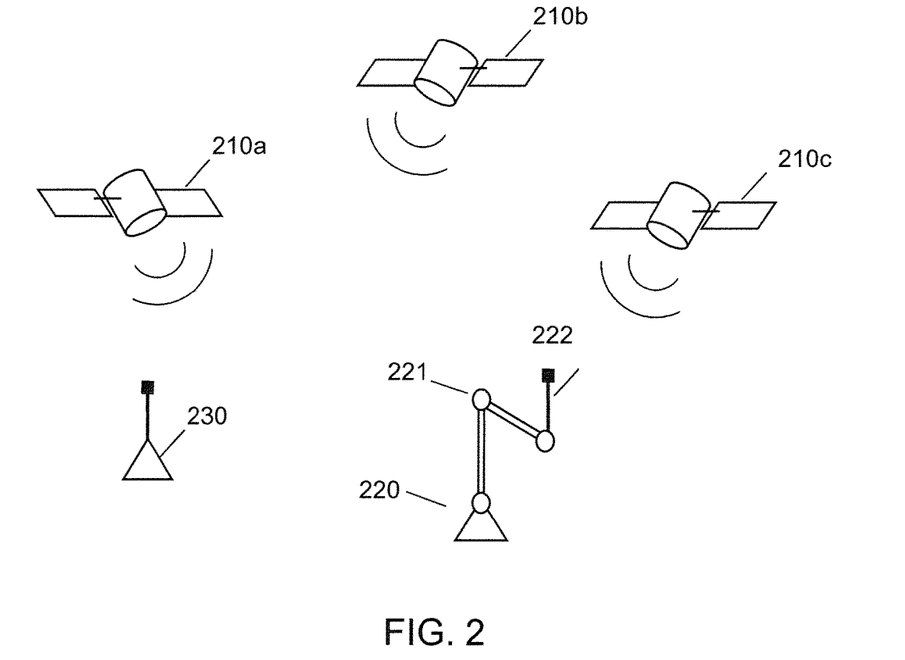
FIG. 2 is a diagram of a system according to some embodiments.

Referring next to FIG. 2, a GNSS system with a GNSS satellites 210a-c, a receiver antenna assembly 220, and a spoofer 230 is shown. Satellites 210a-c may be generally referred to as space vehicles (SV) and may be any legitimate providers of GNSS signals. While only three satellites 210a-c are shown in FIG. 2, it is understood that a GNSS system typically employs at least dozens of satellites such that at least four satellites are visible to a GNSS receiver at a given location on earth's surface to enable positioning. In the GPS system for example, eight or more satellites may be visible to a GPS receiver at a given location. GNSS satellites may operate in multiple frequencies. For example, the GPS system operates on the L1, L2 and L5 frequencies. L1 transmits a navigation message, the coarse acquisition (C/A) code available to everyone and the encrypted military P(Y) code. P(Y) is the P-code modulated with the W code to get the Y code.

The receiver antenna assembly 220 is configured to detect signals from the GNSS system to allow a GNSS receiver to determine its location and time. The antenna assembly 220 may be mounted to a mounting surface such as a surface on the interior or the exterior of a land, air, or water vehicle or structure. In some embodiments, as shown in FIG. 2, the antenna assembly 220 includes an antenna actuator 221 for controlling the movement of the antenna 222 relative to a mounting surface. The antenna actuator 221 may include one or more mechanisms for causing three-dimensional movement of the antenna 222. The arm and joint mechanism is shown in FIG. 2 as an example only. Any mechanism capable of actuating motion may be implemented without departing from the spirit of the invention.

In some embodiments, the antenna assembly 220 may be an antenna array, and the motion of the antenna may be synthetic motion instead of physical motion. For example, the antenna array may be software controlled to vary the antenna phase center in one or more dimensions. This reduces variations in the radar signature of the antenna, making the synthetic motion of the antenna more difficult to detect using remote sensing. Synthetic motion antennas may also reduce the malfunctions and maintenance costs commonly associated with moving parts.

A more detailed description of a GNSS receiver system is provided below with reference to FIG. 3.

The spoofer 230 generally includes a transmitter for broadcasting spoofing signals which emulates signals from satellites 210a-c in an attempt to cause the receiver to derive a false location and/or time based on the signals. In some embodiments, the spoofer 230 may include receivers and/or sensors that are used to help avoid detection. For example, a sophisticated spoofer may attempt to use radar to detect the motion of the antenna 222 to generate signals that avoid detection.

Figure 3:
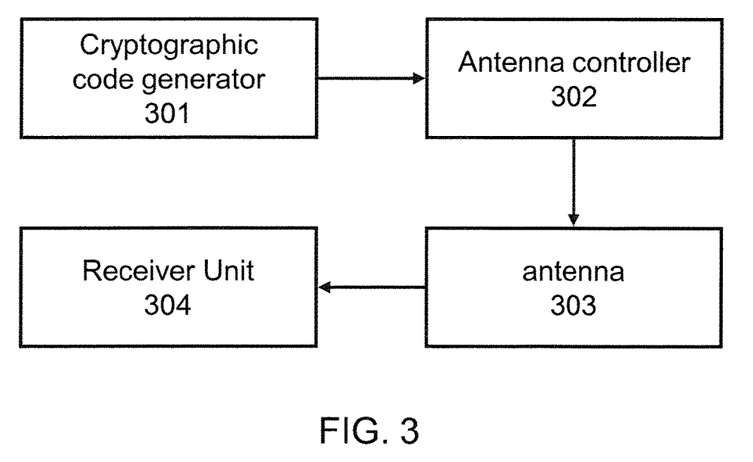
FIG. 3 is a block diagram of a GNSS receiver system according to some embodiments.

Referring next to FIG. 3, a simplified block diagram of an anti-spoofing GNSS receiver system is shown. The receiver system includes a cryptographic code generator 301, an antenna controller 302, an antenna 303, and a receiver unit 304.

The cryptographic code generator 301 generally causes an antenna 303 to have random or pseudo-random motions such that, without knowledge of the cryptographic code, an adversary cannot generate spoofing signals that would emulate the carrier phase histories resulting from the antenna's motion. The cryptographic code generator 301 may be a cryptographic random or pseudo-random number generator (RNG or PNG, respectively; and collectively, 'cryptographic number generator' or CNG) that controls the antenna motion, either physical or synthetic. The CNG may use any of a number of methods, depending on the application and their tradeoffs. A simple example of a PNG is a linear-feedback shift register (LFSR) using a primitive polynomial to generate a maximal-length (ML) sequence. Such a device generates one pseudo-random sequence, having potentially a very long cycle (repeat) time, from a large set of possible sequences (polynomials). These properties make a brute-force attack impractical.

In some embodiments, in addition to outputting a cryptographic code to the antenna controller 302, the cryptographic code is also provided to the receiver unit 304 such that the receiver unit 304 may correlate high-pass-filtered versions of the known antenna motion with high-pass-filtered versions of the carrier phase variations for spoofing detection. In other embodiments, the cryptographic code is regenerated at the receiver unit 304 to avoid transmitting the code. In some embodiments, the cryptographic code is not provided to the receiver unit 304 and the receiver unit 304 operates as a codeless receiver. A codeless receiver may detect spoofed signals by knowing the nature of the antenna motion to be expected, and the different effects that this motion has on spoofed signals compared with 'normal' signals.

The antenna controller 302 controls the motion of the antenna 303 based on the output of the cryptographic code generator 301. In some embodiments, the antenna controller 302 may include a physical actuator having movable parts for actuating the antenna 303. For example, the cryptographic code may be translated into a sequence of motions and the antenna controller may cause one or more moving parts of an antenna actuator to move antenna 303 according to the sequence of motions. In some embodiments, the code may indicate one or more of a direction of motion, a predetermined position, and a selection of an antenna. In some embodiments, one or more physical actuators may actuate the motion of an antenna array. In some embodiments, the antenna controller may be a synthesized motion controller controlling an antenna array. A software controller may select antenna elements within the antenna array to translate the antenna electrical phase center based on the output of the cryptographic code generator 301 such that the electrical position of the antenna is changed based on the code.

The antenna 303 may be any commonly used GNSS antenna, such as GPS antennas configured for L1, L2, and/or L5 frequencies. In some embodiments, the antenna 303 includes an array of individual antennas that may be controlled to produce synthesized motion. In embodiments with a synthesized motion antenna, the receiver system may include electrical isolation devices such as ferrite circulators, attenuators, or isolation amplifiers before the point of control. This reduces variations in the radar signature of the antenna, making the synthetic motion of the antenna more difficult to detect using remote sensing. An antenna assembly configured for synthesized motion is described in more detail below with reference to FIG. 5.

In some embodiments, the signals received by the antennas 303 may also be simultaneously used for GNSS positioning. For example, the carrier beat phase for each satellite signal may be determined as the received signals are synced for positioning. In some embodiments, the antenna 303 may be dedicated anti-spoofing antennas and a separate antenna, possibly stationary relative to the mounting surface, is used for GNSS positioning.

The receiver unit 304 may be configured to detect a spoofed signal and/or determine a location based on signals received by the antenna 303. Generally, a GNSS receiver determines the travel time of a signal from a satellite by comparing the "pseudo random code" it is generating, with an identical code in the signal from the satellite. The receiver slides its code later and later in time until it syncs up with the satellite's code. The amount it has to slide the code is equal to the signal's travel time. However, the bits (or cycles) of the pseudo random code are wide and synced signals may still contain plenty of slop. The carrier-phase uses the waves of the specific frequency of the GNSS signal (i.e. the carrier signal) to further sync the receiver with the satellite. The receiver unit 304 may include a plurality of hardware and/or software modules. Generally, the receiver unit 304 may include the components of a typical GNSS receiver. The receiver may include additional software and/or hardware modules to process the GNSS signals received by the antenna 303 for spoofed signal detection. The anti-spoofing functions may be provided by hardware devices, a processor executing a set of computer executable code, or a combination of the two. A more detailed description of a method of spoofed signal detection is provided herein with reference to FIG. 4 below.

In some embodiments, the cryptographic code generator 301, the antenna controller 302, and the antenna 303 may be part of an antenna assembly. The antenna assembly may be physically separated from or integrated with the receiver unit 304.

In embodiments in which the antenna assembly is physically separate from the receiver unit 304, the cryptographic code may be generated inside the antenna assembly, and then regenerated at the receiver unit 304. This avoids having to transmit the code and reduces the chance of adversary sensing electromagnetic emissions radiated by the antenna, the receiver, or the cable between them to obtain the cryptographic code. The receiver unit 304 may be configured to synchronize to the incoming signal pattern, knowing only the time-invariant part of the secret, the polynomial for example, to regenerate the cryptographic code.

In some embodiments, the motion of the antenna 303 may be determined by the receiver unit 304 using the cryptographic code from the cryptographic code generator 301. In some embodiments, the motion of the antenna 303 may be determined using a separate antenna motion sensor (not shown) providing an output to the receiver unit 304.

In some embodiments, the receiver unit 304 may be a "codeless" receiver, i.e. one that is not aware of the actual cryptographic code sequence in use. In such implementations, a true random sequence may be used, for example, a digitized electronic noise. A codeless GNSS receiver can detect spoofing without knowledge of the specific sequence. It does so by knowing the nature of the antenna motion to be expected, and the different effects that this motion has on spoofed signals compared with 'normal' signals. The resulting carrier phase variations may be nearly identical for all GNSS signal channels in the spoofed case, whereas the variations are correlated but at different levels in the normal case (e.g., see FIGS. 1A and 1B). This is a consequence of the differing geometry of the two cases.

Figure 4:
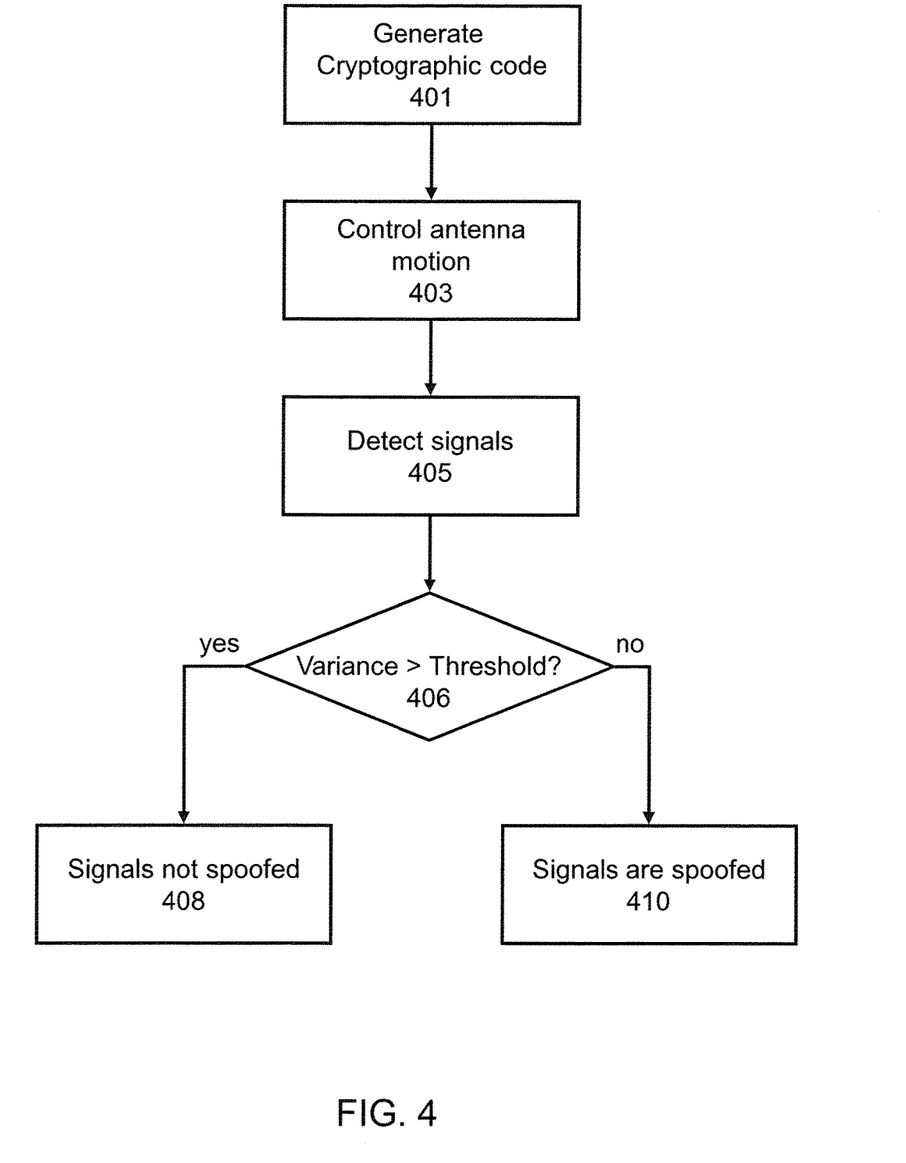
FIG. 4 is a flow diagram of a method for spoofed signal detection according to some embodiments.

Referring next to FIG. 4, a process of detecting spoofed GNSS signal is shown. In step 401, a cryptographic code is generated. The cryptographic code may be generated by a RNG or PNG, for example. The code may include one or more of numbers, letters, waveforms, etc.

In step 403, the motion of the antenna is controlled according to the cryptographic code. An antenna controller may translate the cryptographic code into a series of motions and actuate the antenna accordingly. In some embodiments, a portion of the cryptographic code may be used to select one of the antenna elements in an antenna array. The motion of the antenna may be physical or synthetic.

In step 405, signals from multiple satellites are detected while the antenna is in motion relative to the mounting surface. A receiver unit may measure the carrier phase variation of the satellite signals over a period of time that the antenna is in motion.

In step 406, the receiver unit determines whether the variance in the carrier phase variations of the signals is greater than a predetermined threshold. In some embodiments, the variance is based on the differences between the carrier phase histories and the known antenna movement. A receiver unit may collect short segments of beat carrier-phase time histories and correlate high-pass-filtered versions of the known antenna motion with high-pass-filtered versions of the carrier phase variations. The amount of correlation determines whether the signal is spoofed or not. In some embodiments, the antenna movement may be derived from the cryptographic code generated at the antenna assembly and transmitted to the receiver unit. In some embodiments, a cryptographic code is regenerated at the receiver unit.

In some embodiments, the variance is based on the differences of the beat phase histories between signals from different satellites without the use of the cryptographic code.

The receiver unit may determine whether the differences in the carrier phases of each satellite signal exhibit substantial variance from each other due to the Doppler Effect caused by the movement of the antenna without knowledge of the antenna's movement pattern.

The threshold may be based on a prior measurement of ranges of carrier phase variations of normal (un-spoofed) signals. In some embodiments, the receiver unit may perform calibration under controlled environments to determine a threshold value prior to the process shown in FIG. 4.

If the variance is larger than the threshold value in step 406, the receiver unit determines that the signals are not spoofed in step 408. In some embodiments, following step 408, the receiver system proceeds to calculate a coordinate and/or a current time based on the received signal and outputs the determined position to enable GNSS based navigation.

If the variance is smaller than or equal to the threshold value, the receiver unit determines that the signals are spoofed in step 410. In some embodiments, following step 410, the receiver system may generate an alert to notify an operator so the operator can take remedial actions. In some embodiments, an alert is only generated if the carrier phase variance is lower than the threshold value for a sustained period of time.

As an illustration, a set of example test results is provided below in Table 1 and Table 2. In this test, a "codeless" receiver system having a two dimensional mechanically articulated GNSS data antenna is used. The test fixture antenna moves in a sinusoidal motion that will vary the carrier phase data differently depending on the origin of the signal, resulting in varying power levels in the covariance matrix and varying signs depending on its location.

Table 1 shows a covariance matrix of genuine GPS and Glonass signals. Table 2 shows a covariance matrix of signals generated by a GNSS repeater connected to a reference antenna receiving a genuine signal. In this case, since a repeater is used for all the satellites, the sinusoidal motion affects the carrier phase data the same.

TABLE 1

Covariance Matrix of a non-spoofed signal

|       | sat 1  | sat 2  | sat 3   | sat 4   | sat 5   | sat 6   | sat 7   | sat 8   |
|-------|--------|--------|---------|---------|---------|---------|---------|---------|
| sat 1 | 0.1185 | 0.0983 | −0.0635 | −0.1119 | −0.0627 | 0.085   | −0.0584 | 0.0711  |
| sat 2 |        | 0.126  | −0.0553 | −0.0965 | −0.057  | 0.0783  | −0.0534 | 0.0646  |
| sat 3 |        |        | 0.0727  | 0.0808  | 0.0427  | −0.048  | 0.044   | −0.043  |
| sat 4 |        |        |         | 0.1526  | 0.088   | −0.0873 | 0.0836  | −0.0733 |
| sat 5 |        |        |         |         | 0.0652  | −0.0526 | 0.0549  | −0.0399 |
| sat 6 |        |        |         |         |         | 0.089   | −0.0484 | 0.0566  |
| sat 7 |        |        |         |         |         |         | 0.0526  | −0.0395 |
| sat 8 |        |        |         |         |         |         |         | 0.06    |

TABLE 2

Covariance Matrix of a spoofed signal

|       | sat 1  | sat 2  | sat 3  | sat 4  | sat 5  | sat 6  | sat 7  | sat 8  |
|-------|--------|--------|--------|--------|--------|--------|--------|--------|
| sat 1 | 0.0518 | 0.0415 | 0.0362 | 0.0453 | 0.0325 | 0.047  | 0.0418 | 0.0498 |
| sat 2 |        | 0.0609 | 0.0442 | 0.0537 | 0.0385 | 0.0548 | 0.0501 | 0.0596 |
| sat 3 |        |        | 0.0521 | 0.0456 | 0.0385 | 0.0469 | 0.0481 | 0.0497 |
| sat 4 |        |        |        | 0.0775 | 0.0408 | 0.069  | 0.0673 | 0.0748 |
| sat 5 |        |        |        |        | 0.0464 | 0.0423 | 0.0425 | 0.0437 |
| sat 6 |        |        |        |        |        | 0.0777 | 0.0665 | 0.0727 |
| sat 7 |        |        |        |        |        |        | 0.0747 | 0.0716 |
| sat 8 |        |        |        |        |        |        |        | 0.0848 |

The lower left halves of the tables are omitted because they duplicate the information shown. The diagonal line of data in the tables are omitted in the statistical analysis discussed below, since a signal's correlation to itself is always strong.

The tables show the covariance values between the two responding satellite signal's phase variations. The covariance values generally represent how the phase variance of the signals change together. In the data set shown in Table 1, for example, a signal from satellite 1 (sat 1) has a strong positive covariance with sat 2, a moderate negative covariance with sat 3, and a strong negative covariance with sat 4. In some embodiments, the receiver unit may select the satellite signal with the highest average covariance as a reference signal. In some embodiments, the system may selectively omit satellite signals with less then optimum characteristics in the analysis. For example, statistical outliers may be omitted.

As can be seen in Table 1, in normal circumstances, covariance values between satellite signals includes both positive and negative values. In Table 2, the spoofed signals from the repeater produced only positive covariance values because each signal originated from the same source and are affected by the motion of the receiver antenna similarly.

In some embodiments, the receiver system may calculate a statistic value for the covariance values of the received signals with the equation: statistic=abs(stdev/mean) and determine whether the statistic value exceeds a threshold. For example, in Table 1, the standard deviation (stdev) of the data set (excluding the diagonal line) is 0.069531, and the mean is −0.0051. Therefore, the statistic value of table 1 is 13.63351. For table 2, standard deviation is 0.012, mean is 0.050536, and the statistic value is 0.237465. In some embodiments, the threshold statistic value may be set at 1. As such, the system could automatically calculate and determine that the data in Table 1 came from non-spoofed sources and the data in Table 2 came from a spoofer based on their statistic values.

In some embodiments, the system may simply count the number of positive covariance values in the data set as compared to the number of negative covariance values. In a normal case, an approximately equal number of positive and negative covariance values are expected; in the spoofed case, most if not all of the covariance values should be positive. For example, in Table 1, there are 12 positive covariance values and 16 negative covariance values; in the spoofed case shown in Table 2, all 28 covariance values are positive. The threshold value may then be a number of positive covariance that exceeds what is normal for an un-spoofed signal. For example, a threshold value may be 26 or 27 positive covariance values in the eight signals example shown.

In some embodiments, a one-tail binomial test based on binomial distribution may be used to detect spoofed signals. The expected occurrences of positive covariance values in an un-spoofed signal may be around 50%, while the occurrences of positive covariance values in spoofed signals may be close to 100%. Therefore, if the percentage of positive covariance in a result set is within a minimum confidence value (e.g. 5%), of 50%, the system may determine the signals to be genuine. Alternatively, the system may determine whether the percentage of positive covariance is within a minimum confidence value to 50% (un-spoofed) or a minimum confidence value of 100% (spoofed) to determine whether the variance exceeds a threshold in step 406. The minimum confidence value may be determined based on testing and/or calibration of the receiver system. In some embodiments, the binomial test may be implemented using the chi-squared test to increase computation speed.

In some embodiments, an alert may also be triggered if the percentage of positive covariance values is outside of the expected values for both spoofed and un-spoofed signals. For example, while a spoofer is unlikely to produce signals with a set of covariance values that is around 75% or under 35% positive, such percentage is also unusual for normal signals and may signal other types of interferences or system issues. Therefore, based on the percentage of positive covariance values between the phase variations of the signals, the system may automatically determine whether the signals are genuine, spoofed, and/or have other unidentified issues.

In general, the detected signals may also be evaluated based on the methods described in WO 2014/047,378 to Psiaki, the disclosure of which is incorporated by reference, to determine whether the signal is spoofed.

Generally, in a secure cryptographic system, a secret (such as a password or key) is the only way to defeat the system faster than a brute-force attack. In other words, there is no 'backdoor' or other vulnerability that can be exploited to defeat the system. Only an exhaustive search through the possible key space will find the secret. Such a brute-force search requires on average N/2 tries, where N is the size of the key space: $N=2^{128}$ for a 128-bit key, for instance. Cryptanalysis presumes that the adversary has knowledge of everything about the system except the secret (key). He knows the method being used (for example, the Advanced Encryption Standard); he has access to unlimited plaintext/cyphertext pairs as well as any specialized hardware. He may be allowed a 'chosen plaintext attack,' in which he can have the method (using the secret key) encrypt his chosen message or plaintext.

A system which is secure in the cryptographic sense as applied to spoofing detection is one in which the adversary knows everything about the anti-spoofing method, except the secret (key or password, for example). The adversary is presumed to be able to obtain and analyze (reverse engineer) the GNSS antenna and receiver system. He knows everything about it, including even the secret used in that particular device. He is able to obtain detailed knowledge of the target installation, including the location and orientation of the target antenna. He is able to install and operate means of remote sensing without being detected, and to generate spoofing signals similar to those used in the invention. He has means to know if he has successfully broken the scheme. Despite this information, there exists no known method to defeat the system faster than a brute-force attack against the secret and the brute-force attack requires an overwhelmingly long time, then the system can be said to be secure.

For example, a cryptographic code generator may use a 31-bit LFSR to generate a pseudo-random sequence. This LFSR is clocked at a 4/s rate, i.e. it generates four new pseudo-random bits per second. Two bits are used to select one of four antenna elements in a 2×2 array; element selection is updated twice per second. This LFSR has a sequence length of $2^{31}-1$, or 2147483647. Since this number is prime relative to 2 (the number of bits used each update), the antenna motion sequence will repeat each 1073741823.5 seconds, which is approximately 34 years. Since $2^{31}-1$ is a Mersenne prime, there are $(2^{31}-2)/31=69273666$ ($\sim 2^{26}$) primitive polynomials (those which will generate a maximal-length sequence) of degree 31, i.e. suitable to build an ML-LFSR with 31 bits. An adversary will know neither the specific primitive polynomial used in an individual antenna/receiver system, nor will he know the initialization vector (IV, or seed) used to start the LFSR, nor how long it has been running (collectively, the secret). He will need to perform an exhaustive search of the order $2^{26} \times 2^{31}$ to find the right sequence and sequence phase. Each try will take around a minute, even presuming that the adversary will know immediately when he has found the right combination. Such an exhaustive search would take about 130 billion years. If for some reason that is not thought to be secure enough, a longer LFSR can easily be used, with only a minor penalty in acquisition time; or another, more secure CNG design could be used.

Figure 5:
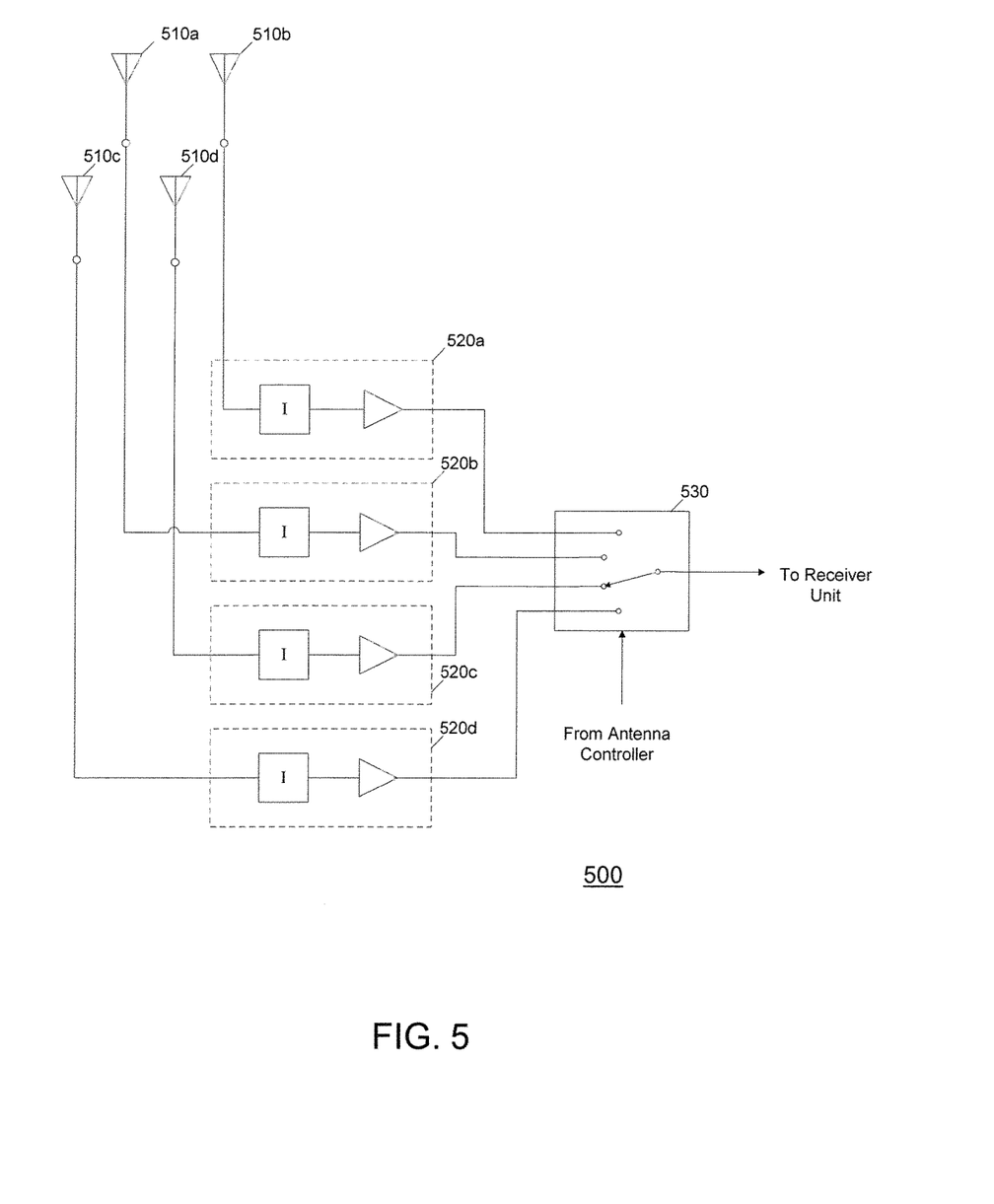
FIG. 5 is a diagram of an antenna system according to some embodiments.

Next referring to FIG. 5, an antenna system configured for synthetic movement is shown. The antenna system 500 includes a selector 530 and an array of antenna elements 510a-d each coupled to an isolation element 520a-d.

Antenna elements 501a-d may be any conventional GNSS receiver antenna. While only four antennas are shown, it is understood that an array can include any number of antennas. In the four antennas configured shown in FIG. 5, the antenna elements 510a-d may be arranged in a 2×2 (square) array. For a L1 frequency receiver at 1575 MHz, for example, the array may have centers of approximately ¼ wavelength or 45 mm. The spacing of the antenna array and the range of motion of a physical motion antenna may be selected based on the intended received signal. The range of motion may be large enough for the variations to be detectable above the noise, and at the same time avoid being so large that it confounds the receiver's phase tracking mechanism. For example, the range of motion may be around ¼ wavelength of the received signal.

The selector 530 is programmed to select one of the antenna elements 510a-d based on the input from an antenna controller. The selector 530 may be a 4:1 multiplexer as shown in FIG. 5 for a four antenna array. In some embodiments, each time the cryptographic code generator is updated, it provides one new bit (0 or 1) of data. Based on this bit, the multiplexer may be controlled to change its selection either in the clockwise (bit=0) or counterclockwise (bit=1) direction. For example, when antenna element 510a is currently selected, if the cryptographic code generator outputs a 0, the selector 530 may be switched to select antenna element 510b. If the cryptographic code generator outputs 1 instead, the selector 530 may be switched to select antenna element 510c. A mechanically-controlled antenna may similarly have two, three, four, or more defined positions, and the actuator of the antenna may be controlled in a similar manner.

The isolation elements 520a-d are electrical isolation devices that may include one or more of ferrite circulators or isolators, isolation amplifiers, attenuators, etc. The isolation elements 520a-d are coupled between the selector 530 and the respectively antenna elements 510a-d to minimize the variation of the radar cross section of the antenna assembly by reducing the variation in the reflected signal related to antenna motion.

It is important that the adversary cannot directly determine the CNG sequence being used. If he could do so, for example using a radar, then he might be able to use that information directly (i.e., without knowledge of the secret) to defeat the security of the system. In cryptography, this is called a 'side-channel attack.' Minimizing the observable radar signature of the antenna array motion can reduce the chance of successful side-channel attacks. Using a cryptographic sequence to control the antenna position complicates the adversary's challenge, since he does not know the secret. Therefore, he would need to employ a significantly higher signal-to-noise ratio (SNR) to measure the antenna position in real time, as it moves: he cannot use averaging to improve SNR, as he might if the antenna position was changing in a periodic fashion. Higher SNR requires greater radar effective radiated power.

An estimate of the required radar transmitter power can be determined using a path loss calculation based on Friis's transmission equation, which states the path loss in free space (approximately the same as for a line of sight condition) given the signal wavelength (or frequency) and distance.

$$L = 20\log_{10}\left[\frac{\lambda}{4\pi D}\right]$$

where L is expressed in dB (decibels); $\lambda$ is the wavelength of the radio frequency signal, and D the distance; the units of $\lambda$ and D being the same.

One can use this method to determine the received (by the target) power, and estimate the retransmitted (reflected) power based on the reflection coefficient (mismatch) of the target antenna. Allowing for (1) the target antenna gain in the direction of the adversary, (2) the adversary's transmit and receive antenna gains, and (3) his required signal levels to maintain an adequate SNR, one can estimate the isolation required in the antenna and LNA system to avoid detection, or equivalently, the required transmitter power:

$$P_T = P_R + \text{SNR} + 2L + 2G_A - (R - I) - G_T - G_R$$

where $P_T$ is the transmitted power and $P_R$ the receiver sensitivity, both in dBm (or dBW); SNR is the required signal-to-noise ratio; L is the path loss as calculated above; $G_A$ is the target antenna gain in the direction of the spoofer; R is the target antenna reflection coefficient at the radar frequency, I is the antenna system isolation, $G_T$ and $G_R$ are the gain of the spoofer's transmit and receive antennas. All of the quantities SNR through $G_R$ are in dB. SNR, L, $G_T$, $G_R$ and I are normally positive; R is normally negative and $G_A$ may be either positive or negative depending on the target antenna pattern in the direction of the spoofer at the radar frequency of operation.

Isolation is defined here as the apparent reflected power change caused by antenna position change: $I = -20\log_{10}|\Gamma_1 - \Gamma_2|$; where $\Gamma_1$ and $\Gamma_2$ are the complex reflection coefficients of the antenna terminations in the 'on' and 'off' states, or equivalent. Said isolation is approximately zero (dB) for a mechanically-actuated antenna, so practical implementations of this invention will almost certainly use synthesized motion.

In such implementations, electrical isolation devices (ferrite circulators or isolators, isolation amplifiers, attenuators, etc.) located between the antenna and the controlled (switched, modulated, etc.) stage can increase the value of I significantly. These devices have as a characteristic $I_D = -20\log_{10}|S_{12}S_{21}| > 0$, where $S_{12}$ and $S_{21}$ are the device forward and reverse gain (scattering coefficients), and $I_D$ is the device isolation, of the device. Normally these devices are engineered to produce device isolation measured in the tens of dB; however, even a typical LNA with device isolation of ~6 dB produces some improvement in performance. The isolation of the isolation device(s) used may be added (in dB) to the isolation of the controlled stage to determine the total isolation I of the system.

Note that the adversary's effective radiated power (actual radar transmitter power, multiplied by antenna gain) cannot exceed a certain limit without overloading (blocking) the target antenna and LNA, which would be detected by the target system as loss of lock (jamming). A receive power of −20 dBm at a nearby frequency would probably overload the receiver, depending on LNA overload characteristics. Satellite signals are orders of magnitude smaller, typically −135 dBm. The target receives (jamming) power $P_J$, from the spoofer's radar transmission, can be calculated using the same parameters as above:

$$P_J = P_T - L + G_A + G_T$$

Another means an adversary might try to use to determine the CNG sequence is to sense electromagnetic emissions radiated by the antenna, the receiver, or the cable between them. These components may be designed such that any emissions containing usable information regarding the CNG sequence are below detectable limits. The actual GNSS signals, produced at the (amplified) output of the antenna LNA, embody the CNG sequence and may be protected. These signals are at low levels (typically around −100 dBm), so the appropriate shielding could be implemented. For example, an electro-magnetic shielding could cover one or more components of the receiver to reduce the possibility of detection.

Physical embodiments of the invention may design a system in which the CNG sequence is generated inside the antenna assembly, and then regenerated at the receiver, if the two are physically separated. This avoids transmitting the sequence itself, presumably at high levels (RS-485 levels, for instance; approximately 5 volts), thereby reducing the opportunity for an adversary to remotely sense the CNG sequence. The receiver may be configured to synchronize to the incoming signal pattern, knowing only the time-invariant part of the secret—the polynomial for example. Many CNG generators have this property, which is very useful in cryptography in general.

The adversary has a formidable challenge ahead of him, even if he manages to discover the polynomial used to generate the PNG sequence (or whatever secret is used, for other CNG methods than an LFSR). The complete secret the adversary needs to know includes both the polynomial and the sequence phase; that is, where in its (e.g. 34-year long) cycle the sequence generator is operating.

He could generate a spoofing signal using only the polynomial, but without knowing the PNG phase (which the target receiver knows), he will still be detected. The target receiver can determine the PNG phase from the recovered GNSS signals, but the adversary, having no way to obtain this information, cannot. Even a codeless receiver would be able to identify the combined effects of synthesized antenna motion and the spoofer's attempt, due to the unexpected carrier phase patterns caused by the combination of the two effects.

The adversary's difficulty in mounting a successful attack is reduced (from one in $2^{57}$) to about one in $2^{31}$ for the LFSR example given earlier. This would still require over 2000 years for a brute-force attack. Again, a longer PNG sequence, or a more secure form of CNG, could be used to make this even more difficult.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for spoofed signal detection comprising:
    generating a cryptographic code with a cryptographic code generator coupled to an antenna controller;
    translating, at the antenna controller, the cryptographic code into a sequence of motions;
    controlling, with the antenna controller, a motion of at least one antenna of a Global Navigation Satellite System (GNSS) receiver system according to the sequence of motions;
    detecting a plurality of satellite signals during the controlled motion of the at least one antenna; and
    determining, at a receiver unit and based on carrier phase variations of the plurality of satellite signals, whether the plurality of satellite signals originated from a spoofer transmitter.

2. The method of claim 1, wherein the generating of the cryptographic code comprises generating one of a random number and a pseudo-random number.

3. The method of claim 1, further comprising: regenerating the cryptographic code at the receiver unit and determining the motion of the at least one antenna based on the regenerated cryptographic code.

4. The method of claim 1, wherein the cryptographic code is only used by an antenna controller for controlling the motion of the at least one antenna and is not transmitted.

5. The method of claim 1, wherein controlling the motion of the at least one antenna comprises causing physical motion of the at least one antenna relative to a mounting surface.

6. The method of claim 1, wherein controlling the motion of the at least one antenna comprises controlling an antenna array to cause synthesized motion.

7. The method of claim 1, wherein the determining whether the plurality of satellite signals originated from a spoofer transmitter step comprises:
    correlating the motion of the at least one antenna with carrier phase histories of each of the plurality of satellite signals; and determining whether a variance of the carrier phase histories and the motion of the at least one antenna exceeds a threshold.

8. The method of claim 1, wherein the determining whether the plurality of satellite signals originated from a spoofer transmitter step comprises:
comparing carrier phase histories of each of the plurality of satellite signals while the at least one antenna is in motion; and
determining whether a variance between the carrier phase variations of the plurality of satellite signals exceeds a threshold.

9. The method of claim 1, wherein the GNSS receiver system further comprises one or more electrical isolation devices for reducing variations in antenna reflected signals in a synthesized motion antenna.

10. The method of claim 1, wherein the GNSS receiver system further comprises an electro-magnetic shielding covering one or more of its components to prevent detection of at least one of the cryptographic code and the motion of the at least one antenna.

11. A system for spoofed signal detection comprising:
a cryptographic code generator for generating a cryptographic code;
an antenna controller for translating the cryptographic code into a sequence of motions and controlling a motion of at least one antenna of a Global Navigation Satellite System (GNSS) receiver system according to the sequence of motions; and
a receiver unit configured to:
detect a plurality of satellite signals received during the controlled motion of the at least one antenna; and
determine, based on carrier phase variations of the plurality of satellite signals, whether the plurality of satellite signals originated from a spoofer transmitter.

12. The system of claim 11, wherein the cryptographic code generator comprises one of a random number generator and a pseudo-random number generator.

13. The system of claim 11, wherein the receiver unit is further configured to: regenerate the cryptographic code and uses the cryptographic code to determine the motion of the at least one antenna.

14. The system of claim 11, wherein the cryptographic code is only used by the antenna controller and is not transmitted.

15. The system of claim 11, wherein the antenna controller is configured to control the at least one antenna by causing physical motion of the at least one antenna relative to a mounting surface.

16. The system of claim 11, wherein the antenna controller is configured to control the at least one antenna by controlling an antenna array to cause synthesized motion.

17. The system of claim 11, wherein the receiver unit is configured to determine whether the plurality of satellite signals originated from a spoofer transmitter based on:
correlating the motion of the at least one antenna with carrier phase histories of each of the plurality of satellite signals; and
determining whether a variance of the carrier phase histories and the motion of the at least one antenna exceeds a threshold.

18. The system of claim 11, wherein the receiver unit is configured to determine whether the plurality of satellite signals originated from a spoofer transmitter based on:
comparing carrier phase histories of each of the plurality of satellite signals while the at least one antenna is in motion; and
determining whether a variance between the carrier phase variations of the plurality of satellite signals exceeds a threshold.

19. The system of claim 11, further comprising: one or more electrical isolation devices for reducing variations in antenna reflected signals in a synthesized motion antenna.

20. The system of claim 11, further comprising: comprises an electro-magnetic shielding covering one or more of its components to prevent detection of at least one of the cryptographic code and the motion of the at least one antenna.

21. An apparatus for spoof signal detection comprising:
receiving a cryptographic code from a cryptographic code generator;
translating the cryptographic code into a sequence of motions;
controlling a motion of at least one antenna of a Global Navigation Satellite System (GNSS) receiver system based on the sequence of motions; and
providing a plurality of satellite signals received during the controlled motion of the at least one antenna to a receiver unit.

22. The method of claim 1, wherein the receiver unit is configured to determine whether the plurality of satellite signals originated from a spoofer transmitter without determining or receiving the cryptographic code.

* * * * *